June 30, 1953

L. TARWATER 2,643,649

ELECTRIC TIE TAMPER

Filed Aug. 20, 1949

INVENTOR
LAWSON TARWATER
BY
*Mason & Graham*
ATTORNEYS

June 30, 1953  L. TARWATER  2,643,649
ELECTRIC TIE TAMPER
Filed Aug. 20, 1949  2 Sheets-Sheet 2
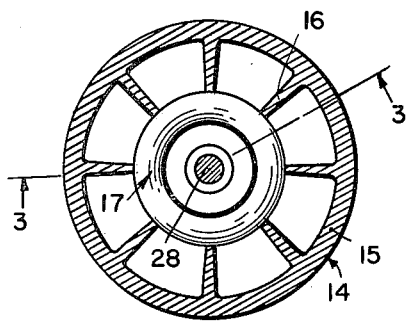
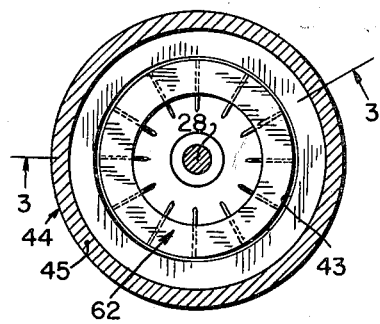
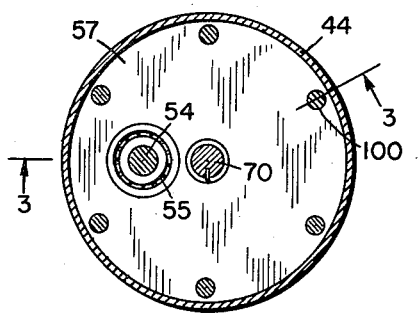
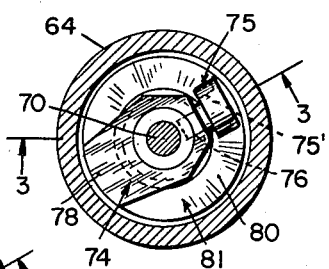
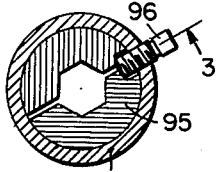
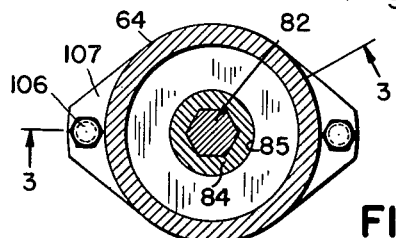
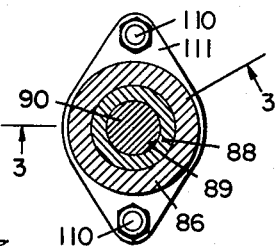
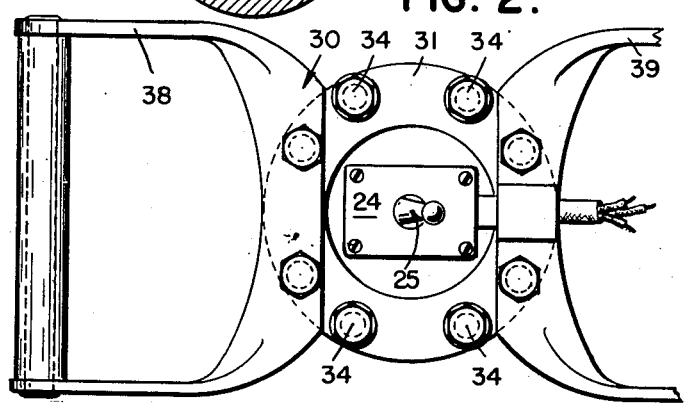
INVENTOR
LAWSON TARWATER
BY
Mason & Graham
ATTORNEYS Patented June 30, 1953

2,643,649

UNITED STATES PATENT OFFICE 2,643,649

ELECTRIC TIE TAMPER

Lawson Tarwater, Redlands, Calif., assignor to Tarwater Railway Supply Co., a corporation of California Application August 20, 1949, Serial No. 111,421

1 Claim. (Cl. 125—31)

This invention has to do with power-driven, manually held tamping machines.

An object of this invention is to provide a novel electrical tamping machine which is easy to operate.

A further object is to provide an electrical tamping machine adapted to be manually held which has a rapid tamping action.

Still another object of the invention is to provide a tamping machine of the type indicated which is constructed of a plurality of subassemblies or sections detachably joined whereby the same can be economically manufactured and assembled and readily repaired.

Another object is to provide an electrical tamping machine which is so designed that several of the machines can be operated from one portable generator.

A further object is to provide a tamping machine having an electrical motor and a simplified drive means for transmitting the rotative motion of the motor drive shaft into reciprocatory rectilinear movement to operate a tamping tool.

Another object is to provide a tamping tool having a shock absorbing handle mounting.

These and other objects will be apparent from the drawings and the following description thereof.

Referring to the drawings:

Fig. 2 is a plan view of the machine of Fig. 1;

Fig. 4 is a section on line 4—4 of Fig. 3;

Fig. 5 is a section on line 5—5 of Fig. 3;

Fig. 6 is a section on line 6—6 of Fig. 3;

Fig. 7 is a section on line 7—7 of Fig. 3;

Fig. 8 is a section on line 8—8 of Fig. 3;

Fig. 9 is a section on line 9—9 of Fig. 3; and

Fig. 10 is a section on line 10—10 of Fig. 3.

Figure 3:
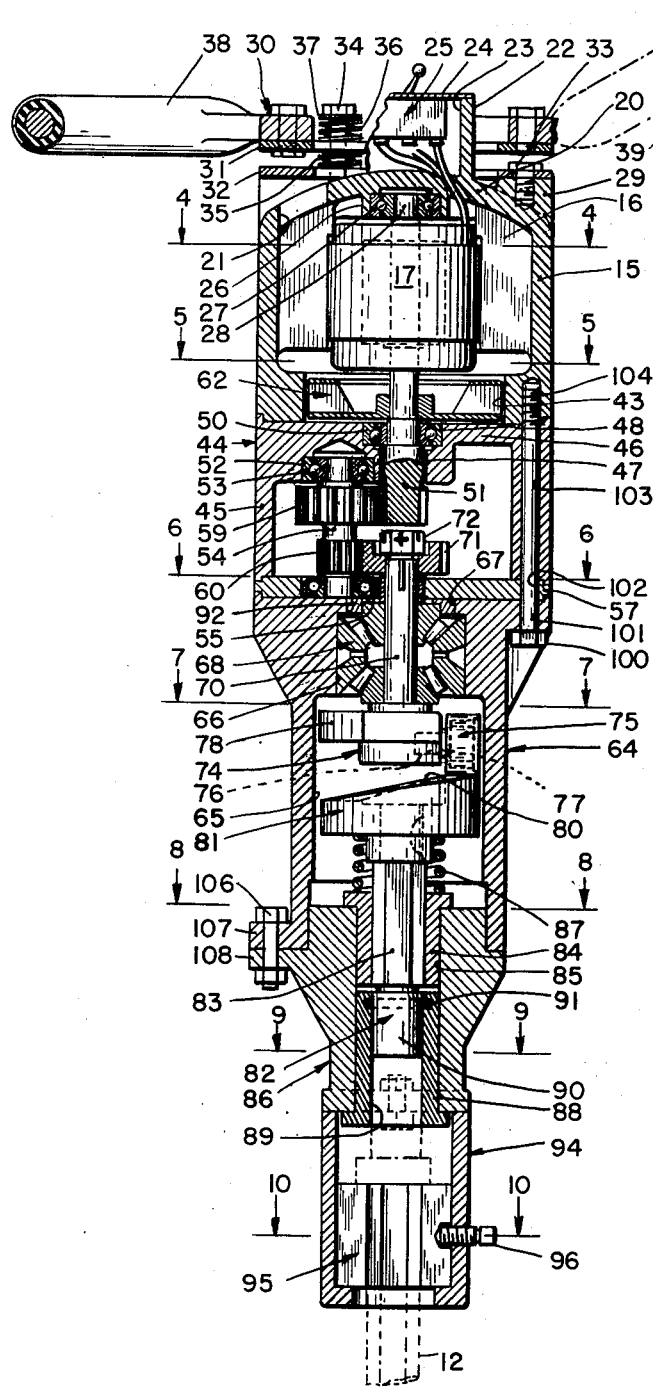
Fig. 3 is a sectional elevational view on an enlarged scale of the machine of Fig. 1, the planes of the view being indicated by the several lines 3—3 on Figs. 4-10, inclusive.
Figure 1:
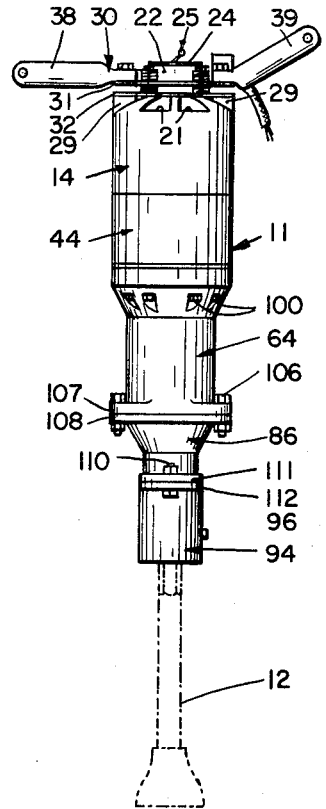
Fig. 1 is an elevational view of a tamping machine embodying the invention.

More particularly describing the invention, reference numeral 11 generally indicates the casing of the machine and in Fig. 1 a tamping tool 12 is shown in broken lines extending from the lower end of the machine. As will later appear, various tools may be used with the machine.

The upper end of the casing is formed by a motor housing 14 which includes an annular wall 15 from which extend radially inwardly projecting ribs 16 for supporting a motor 17 adapted to fit tightly therein. The upper end of the motor housing is provided with a dome-like end wall 20 which is provided with apertures 21 for circulation of air. Centrally of the wall 20 there is provided a switch housing 22 defining a recess 23 closed by a switch plate 24 upon which is mounted a suitable electrical switch 25.

The domed wall 20 is also provided with a cylindrical inwardly projecting wall 26 for the reception of a bearing 27 which receives the motor shaft 28.

The domed wall 20 of the motor housing is also provided with a pair of parallel diametrically opposite ribs 29 which support a handle assembly 30. The assembly is a pair of annular plates 31 and 32, the lower plate 32 being secured by bolts 33 to ribs 29. Bolts 34 connect the plates which are spaced apart by intermediate springs 35 therebetween and on the bolts. Outer springs 36 are interposed between washers 37 at the bolt heads and the upper plate. Welded or otherwise secured to the top plate are handles 38 and 39.

The lower or inner end of the motor housing includes a thickened wall portion which defines an opening 43.

Mounted in abutting relation with the motor housing is a gear housing 44 which is made up of an annular wall 45 and an upper or outer end wall 46. The latter is bored at 47 and counterbored at 48 for the purpose of receiving the motor shaft 29 and bearing 50, respectively, the motor shaft having an enlarged end 51 which extends through the bore 47.

The gear housing also includes a circular recess 52 which receives a bearing 53 for supporting a gear shaft 54. This shaft is further supported in bearing 55 which is mounted in a gear plate 57 at the lower end of the gear housing. The shaft 54 is provided with the two gear wheel sections 59 and 60 which rotate with the shaft, gear wheel element 59 being positioned to mesh with gear teeth formed on the enlarged end 51 of the motor shaft.

A blower 62 is mounted on the motor shaft for rotation therewith and fits within the opening 43 at the lower end of the motor housing.

Beyond the gear plate 57 is a cam housing 64 which is generally annular in shape, having an enlarged cylindrical bore 65 therein and beyond this, a bore 66 of lesser diameter. Above the bore 66 is a bore 67 which is smaller than bore 66. A radial and two-way thrust bearing, generally indicated by 68, is mounted in the bore 66 for supporting a drive shaft 70. This shaft carries a pinion 71 at its upper end, the pinion being keyed to the shaft as shown and being held thereon by means of a nut 72. The pinion meshes with the gear wheel 60 of the shaft 54.

The lower end of the drive shaft 70 is provided with an enlarged head 74 which mounts a cam follower consisting of a roller 75 mounted for rotation upon a stud shaft 76 which is mounted radially in the head 74, the shaft being pressed into a bore 77 in the part 74. A roller bearing 75' may be interposed between the roller and shaft. Opposite the follower 75, the head is provided with a radially extending counterweight section 78 to counterbalance the cam follower.

The cam follower 75 is adapted to ride the cam surface 80 of a circular cam 81 which is mounted on a striker bar 82. The striker bar includes a hexagonal section 83 which is received within a bushing 84 of similar internal shape. The bushing is mounted in the bore 85 of a striker housing 86. A spring 87 serves to yieldably urge the cam toward the cam follower.

The striker housing is also provided with a second bushing, indicated by 88, which has a cylindrical bore 89 for receiving a cylindrical end section 90 of the striker bar. An O ring 91 in the bushings serves to act as a seal. A seal ring assembly 92 is also provided at the upper end of the striker housing.

It will be apparent that rotation of the motor shaft rotates the drive shaft 70 through the medium of the gears interposed between the two thereby rotating the cam follower which, through engagement with the cam and in cooperation with the spring 87, imparts reciprocatory movement to the striker bar.

Mounted below the end of the striker housing is a bushing housing 94 which houses a split tool-holding bushing 95 having a hexagonal interior to receive the shank of a tamping tool 12. A set screw 96 retains the bushing in place.

The various sections of the housing are assembled or held together in the following manner. The motor housing, gear housing, and cam housing are secured by bolts 100 extending through suitable bores 101 in the cam housing, bores 102 in the gear plate, bores 103 in the gear housing, and threaded into tapped bores 104 in the motor housing. The striker housing is secured to the cam housing by means of bolts 106 which pass through flanges 107 and 108, respectively, on the cam and striker housing. The bushing housing 94 is secured to the striker housing by means of the bolts 110 which pass through flanges 111 and 112 on the striker and bushing housings, respectively.

I claim:

In an electric tamping machine, a motor housing having handle means thereon at its outer end, a gear housing secured to the inner end of said motor housing, a motor in said motor housing having a shaft projecting into said gear housing, a gear plate at the end of said gear housing farthest from said motor housing, a cam housing beyond said gear plate and secured to said plate and said gear housing, a drive shaft rotatably supported in said cam housing and extending into said gear housing, gear means connecting said motor shaft and said drive shaft, a striker housing secured to the end of said cam housing, a striker bar mounted in said striker housing for axial movement, said bar projecting into said cam housing, a cam carried by said bar having a circular cam track facing said drive shaft, a cam follower on said drive shaft for operative engagement with said cam, a spring in said cam housing urging said cam toward said drive shaft, and means beyond said striker bar for attaching a tamping tool for abutting end-to-end relation to said striker bar.

LAWSON TARWATER.

References Cited in the file of this patent

UNITED STATES PATENTS

| Number | Name | Date |
|---|---|---|
| 1,006,339 | Adams | Oct. 17, 1911 |
| 1,040,424 | Salt | Oct. 8, 1912 |
| 1,273,873 | Kollock et al. | July 30, 1918 |
| 1,511,566 | Kollock | Oct. 14, 1924 |
| 1,887,762 | Horton | Nov. 15, 1932 |
| 2,006,065 | Blake | June 25, 1935 |
| 2,145,760 | Fetherston | Jan. 31, 1939 |
| 2,308,143 | Amtsberg et al. | Jan. 12, 1943 |
| 2,317,158 | Westover | Apr. 20, 1943 |
| 2,519,477 | Kind | Aug. 22, 1950 |

FOREIGN PATENTS

| Number | Country | Date |
|---|---|---|
| 719,886 | France | Nov. 24, 1931 |